(12) United States Patent
Tanaka et al.

(10) Patent No.: US 6,767,391 B2
(45) Date of Patent: Jul. 27, 2004

(54) AIR FILTER

(75) Inventors: Minoru Tanaka, Yokohama (JP); Jun Shimada, Yokohama (JP); Katsuhiro Yamashita, Tokyo (JP); Haruko Sasaki, Yokohama (JP)

(73) Assignee: Nichias Co., Ltd., Tokyo (JP)

( * ) Notice: Subject to any disclaimer, the term of this patent is extended or adjusted under 35 U.S.C. 154(b) by 0 days.

(21) Appl. No.: 10/190,534

(22) Filed: Jul. 9, 2002

(65) Prior Publication Data

US 2003/0019357 A1 Jan. 30, 2003

(30) Foreign Application Priority Data

Jul. 10, 2001 (JP) .................................... 2001-209384

(51) Int. Cl.[7] .............................................. B01D 53/06
(52) U.S. Cl. ............................ 96/115; 96/125; 96/126; 96/144; 96/154; 422/212
(58) Field of Search ......................... 96/115, 125, 126, 96/127, 130, 143, 144, 154; 95/113; 454/187; 422/212

(56) References Cited

U.S. PATENT DOCUMENTS

| 3,197,944 A | * | 8/1965 | Westeren et al. ............. 96/115 |
| 4,259,092 A | * | 3/1981 | Matsuo et al. ................ 95/113 |
| 4,409,006 A | * | 10/1983 | Mattia .......................... 95/113 |
| 4,497,361 A | * | 2/1985 | Hajicek ........................ 96/125 |
| 4,926,618 A | * | 5/1990 | Ratliff ........................... 95/10 |
| 5,242,473 A | * | 9/1993 | Ogasahara ................... 96/125 |
| 5,878,590 A | * | 3/1999 | Kadle et al. .................. 62/271 |
| 6,051,199 A | * | 4/2000 | Teller ...................... 423/245.1 |
| 6,080,227 A | * | 6/2000 | Kurosawa et al. ........... 96/111 |
| 6,083,304 A | * | 7/2000 | Fujimura ..................... 96/145 |

* cited by examiner

Primary Examiner—Frank M. Lawrence
(74) Attorney, Agent, or Firm—Oblon, Spivak, McClelland, Maier & Neustadt, P.C.

(57) ABSTRACT

An air filter includes a honeycomb rotor which carries a porous adsorbent and can be rotated in a circumferential direction, a drive means for rotating the honeycomb rotor, a first partition member provided with a first gas introduction section and a second gas exhaust section and a second partition member provided with a first gas exhaust section and a second gas introduction section, the first and second partition members being disposed on both sides of the honeycomb rotor respectively to allow two gases to flow in counter current to each other and to pass through different conduits respectively, a heater disposed at the inlet port of the first gas introduction section, a drive controller for controlling the drive means such that the honeycomb rotor can rotate intermittently by every part of a regenerative/purge-zone facing the first gas introduction section among the surface of the filter of the honeycomb rotor.

5 Claims, 1 Drawing Sheet

AIR FILTER

BACKGROUND OF THE INVENTION

1. Field of the Invention

The present invention relates to an air filter used to clean air in a clean room and air for cleaning devices in the fabrication of, for example, semiconductors, liquid crystals, and optoelectronics.

2. Description of Background Art

In processes for the fabrication of silicon wafers and the like in semiconductor plants, contaminants such as particles and metal impurities in a clean room cause defects of devices integrated to the extent of 64M bit DRAMs. These contaminants are therefore removed to the minimum using a HEPA filter or ULPA filter. However, in the case of devices integrated to a degree greater than 64M bit DRAM, ppb level gas contaminants in a clean room decrease the production yield. These gas contaminants are known to be originated from outside air, gas generated from the structural parts of the clean room, and chemicals used in the processes.

To reduce these gas contaminants to a concentration level of the order of ppm or less, a method of removing these contaminants are removed using a chemical filter in the clean room is adopted. The chemical filter removes gas contaminants, for instance, by passing the air in a clean room and devices through a filter of an adsorbent such as activated carbon. The gas contaminants are classified into acids, alkalis, and organic substances. To efficiently remove these gas contaminants, the chemical filter generally contains an appropriately selected adsorbent or reactive material absorbing these gases as a carrier.

For instance, amines are contained in an amount of several tens ppm in air and invade into a clean room when the outside air is introduced into the clean room. Also, it is known that basic gas contaminants such as amines are generated from building materials for a clean room and treating chemicals. If these basic gas contaminants exist in an amount of 10 to 20 ppb in a clean room, these contaminants give rise to abnormality in the shape of a photo resistance (T top phenomenon). In addition the basic gases react with acidic gases and form salts, which make the surfaces of optical parts in process equipment and the surfaces of silicon wafers to become cloudy. For this reason, a chemical filter carrying an acidic substance as a reactive material for absorbing gases is used to remove basic gas contaminants such as amines. If acidic gas contaminants exist in a clean room, on the other hand, these contaminants corrode glass fiber of a dust filter to thereby promote the generation of boron and also cause the corrosion of metals such as ICs.

Chemical filters have been used to remove such chemical substances. These chemical filters are manufactured from a porous adsorbent, with or without addition of a spreader, by processing such a porous adsorbent into the form of an air filter, and can remove chemical substances from a gas to be treated passing therethrough. Many chemical filters are used because they can remove various chemical substances. However, these chemical filters have a limitation to the amount of adsorption because they adsorb chemical substances by physical or chemical adsorption. It is therefore necessary to replace these filters after they are used for a certain period of time. The frequency of replacement is usually once several months to once a year, for example, although the frequency depends on working conditions. The replacement involves cost for purchasing new filters as well as maintenance costs. In addition, replacement generates waste materials.

To avoid such a problem, a method using a rotating regenerative type chemical filter is disclosed in the publication of JP-A-2000-296309. This method employs a rotor type chemical filter, which is rotated to adsorb chemical substances in the process air passing through a treating zone. The adsorbed chemical substances are heated in a regenerating zone to desorb and remove the chemical substances. Then, the filter is cooled in a purge zone. These steps are repeated to regenerate the filter continuously. The use of this method enables the filter to be regenerated many times until the adsorbent is deteriorated, saving the necessity for purchasing new filters and for disposal of used filters.

However, because the rotor continues rotating in this method, the regeneration zone must be always heated, resulting in an increased power consumption. In addition, the air after treating is eventually dried due to moisture adsorption by the adsorbent. In a process for the fabrication of semiconductors, the humidity must be controlled at a given level from the reasons described below.

Namely, the temperature and moisture in a clean room must be kept at a certain range. This is because if the temperature and moisture in the clean room exceed the upper limit of this range, the excessive moisture content caused moisture deposited onto the surfaces of silicon substrates. Such moisture deposited on the surfaces may cause acids, alkalis, and organic substances to be dissolved therein. The excessive moisture content also may oxidize the substrate and the like. If the temperature and moisture in a clean room are less than the above range, particles are adsorbed electrostatically onto the surfaces of the silicon substrates and the like because of the excessively small moisture content.

Therefore, in order to maintain a constant moisture content, the temperature and moisture of the air passing through a treating zone has conventionally been detected using a sensor or the like and the air has been treated with pure water or using a humidifier and the like.

However, this method has problems such as cost involved in the treating, requirement for large equipment, and the like.

Therefore, it is an object of the present invention to provide an inexpensive, compact, and long-life air filter.

SUMMARY OF THE INVENTION

In view of this situation, the inventors of the present invention have conducted earnest studies and as a result, found that the running cost of an air filter can be suppressed if a rotor is intermittently rotated by suitably selecting the treating time, regenerating time, and purge time, for example, a ⅛ revolution, once every 6 hours, rather than always rotating the rotor. This fining has led to the completion of the present invention.

Accordingly, the present invention provides an air filter comprising a honeycomb rotor which carries a porous adsorbent and can be rotated in the circumferential direction, a drive means for rotating the honeycomb rotor, a first gas introduction section disposed on one side of the honeycomb rotor and a second gas introduction section disposed on another side of the honeycomb rotor, the first and second gas introduction sections introducing counter-currently flowing two types of gases into different conduits, a first gas exhaust section which is disposed on the other side of the honeycomb rotor and introduces the gas which is introduced from the first gas introduction section and exhausted through the honeycomb rotor, a second gas exhaust section which is disposed on the one side of the honeycomb rotor and introduces the gas which is introduced from the second gas introduction section and exhausted through the honeycomb rotor, a heater disposed at the inlet port of the first gas introduction section, and a drive controller for controlling the drive means so that the honeycomb rotor can rotate intermittently by every part of a regenerative/purge zone facing the first gas introduction section in the filter surface of the honeycomb rotor.

According to the above invention, the time required to operate the heater is shortened because the heater is turned off as soon as the regeneration is finished in the regenerative zone. In addition, because the regenerative zone is used as a purge zone as is after is turning off the heater, the power consumed for rotating the honeycomb rotor can be significantly saved. Also, because a purge operation is carried out using the air in the clean room, the humidity can be maintained constant before and after the purge operation.

BRIEF DESCRIPTION OF THE DRAWINGS

In FIG. 1, 1 represents a honeycomb rotor, 2 represents a drive means, 3 represents a first gas introduction section, 4 represents a first gas exhaust section, 5 represents a second gas introduction section, 6 represents a second gas exhaust section, 7 represents a heater, 10 represents an air filter, 13 represents a first partition plate, 14 represents a second partition plate, 15 represents a first partition member, 16 represents a second partition member, 21 represents a regenerative/purge zone, and 22 represents a treating zone.

DETAILED DESCRIPTION OF THE INVENTION AND PREFERRED EMBODIMENTS

Figure 1:
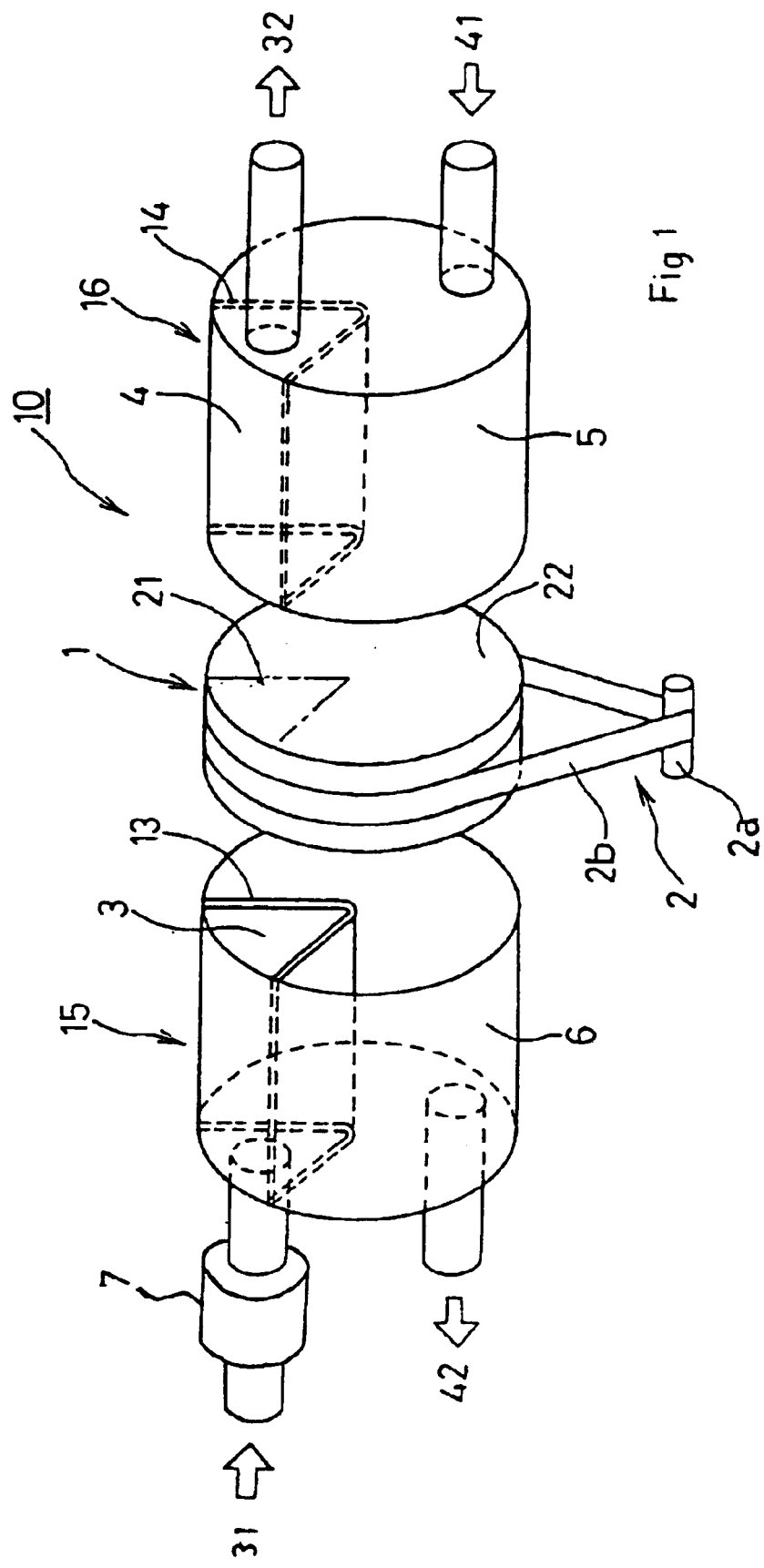
FIG. 1 is a schematic perspective view showing a part of an air filter according to the present invention.

A first embodiment of an air filter according to the present invention will be explained with reference to the drawing. For ease of explanation of the first embodiment, FIG. 1 is illustrated in a manner that the space between the honeycomb rotor 1 and the first partition member 15 and the space between the honeycomb rotor 1 and the second partition member 16 are expanded. However, in the actual filter, these parts are used almost in contact with each other as far as the rotation of the honeycomb rotor 1 is undisturbed, thereby substantially preventing gas from leaking from the clearances between these parts. The honeycomb rotor 1 carries a porous adsorbent, is a honeycomb structure having almost a cylindrical external form, and can rotate in the circumferential direction around the shaft installed in the center. The honeycomb rotor is composed of a porous adsorbent and a honeycomb structure carrying the porous adsorbent. The honeycomb rotor 1 is used to remove organic substances and gaseous impurities such as acidic gases and alkaline gases contained in air. Here, examples of the organic substances include isopropyl alcohol, toluene, butyl acetate, dioctyl phthalate, dibutyl phthalate, dimethylsiloxane, hexamethyldisiloxane and N-methyl-2-pyrrolidone.

The honeycomb structure used in the present invention is prepared from by adhering sheets of fiber base paper using an inorganic adhesive into a honeycomb form. The fiber base paper used in the present invention means woven fabric or nonwoven fabric formed from fiber. Examples of the fiber include glass fibers such as E glass fiber, NCR fiber, AGR fiber, ECG fiber, S glass fiber, and A glass fiber, chopped strands of these glass fibers, and inorganic fibers such as ceramic fiber, alumina fiber, mullite fiber, silica fiber, rock wool fiber, and carbon fiber, as well as organic fibers. As the organic fiber, alamide fiber, nylon fiber, polyethylene terephthalate fiber, and the like may be used. It is preferable to use inorganic fiber as the fiber base paper because the heat resistance and strength of the honeycomb rotor can be improved. Although no particular limitation is imposed on the shape and the like of these inorganic fibers and organic fibers, it is preferable to use fibers having a fiber length of 0.1 to 50 mm and a fiber diameter of 0.1 to 25 $\mu$m. These inorganic fibers and organic fibers may be used either singly or in combinations of two or more.

When the fiber base paper is produced from the above fibers, for example the above fiber may be woven to produce woven fabric or the above fiber may be fixed using an adhesive such as polyvinyl alcohol to produce nonwoven fabric. The fiber base paper used in the present invention usually has a fiber void ratio of 80 to 95% and a thickness of 0.1 to 1 mm. Here, the fiber void ratio means the ratio of the portion (the volume of the void portion) obtained by subtracting the volume occupied by the inorganic fiber from the apparent volume of the fiber base paper to the apparent volume.

To prepare the honeycomb structure from the above fiber base papers, the fiber base papers may be bonded using an inorganic or organic adhesive, for example. The following method may be adopted. Specifically, a plate of fiber base paper is corrugated into a wave-form (hereinafter referred to as "corrugated form" from time to time) by using corrugator or the like. The convex portions of the resulting corrugated fiber base paper are bonded to a plate of fiber base paper using an inorganic adhesive or the like to form one honeycomb layer. This procedure is repeated to laminate and adhere the layers. The manner of lamination may be a method of laminating the single-honeycomb layer objects thus produced or a method of winding the single-honeycomb layer object. The resulting honeycomb structure is then formed into a cylinder and a porous adsorbent is carried thereon to obtain a honeycomb rotor.

Examples of the porous adsorbent to be carried on the honeycomb structure include silica gel, activated carbon, or zeolite. These porous adsorbents may be used either individually or in combination of two or more. These adsorbents are used for the purpose of adsorbing organic substances, acidic gases, and basic gases. As to the adsorption of organic substances among these materials, the organic substances are physically adsorbed to the pores of the porous adsorbent due to van der Waals forces and the like. Therefore, special spreaders such as acids and bases are not needed.

In the present invention, in addition to the porous adsorbent a gas reactive material may be carried on the honeycomb structure. Examples of the gas reactive material include reactive materials absorbing acidic gases and reactive materials adsorbing basic gases. As the reactive material absorbing acidic gases, a wide variety of alkaline inorganic salts may be used. Examples of such inorganic salts include alkali salts such as potassium carbonate. Also, as the reactive material absorbing basic gases, a wide variety of inorganic acids and acidic inorganic salts may be used. Examples of the inorganic acid include sulfuric acid and examples of the acidic inorganic salt include sulfates such as iron sulfate.

The honeycomb rotor 1 can be rotated by the drive means 2. The drive means 2 comprises a motor 2a and a belt 2b. The belt 2b enables the honeycomb rotor 1 to be rotated in the circumferential direction around the shaft (not shown). A drive controller (not shown) is connected to the drive means 2. The drive controller controls the aforementioned drive means so that the honeycomb rotor can rotate intermittently by a part of the regenerative/purge zone 21 facing the first gas introduction section in the filter surface of the honeycomb rotor.

A first partition member 15 and a second partition member 16 are disposed in almost close contact with either side of the filter surface of the honeycomb rotor 1. The first partition member 15 comprises a cylindrical body having almost the same shape and size as the filter surface of the honeycomb rotor 1, a partition plate 13 dividing the inside space of the cylindrical body, and holes formed by drilling in each of the first gas introduction section 3 and second gas exhaust section 6 which are partitioned by the partition plate 13. This first partition member 15 can supply gas to only the filter surface of the honeycomb rotor 1 facing either the first gas introduction section 3 or the second gas exhaust section 6 and exhaust gas from only the filter surface of the honeycomb rotor 1 facing either the first gas introduction section 3 or the second gas exhaust section 6.

The hole formed in the first gas introduction section 3 is communicated with a clean air introduction port (not shown) through a heater 7 which will be explained later. As an example of the clean air introduced from the clean air introduction port, the air circulated in a clean room is given. Also, the hole formed by drilling in the first gas exhaust section 4 is communicated with an air exhaust port (not shown) through, for example, a blower (not shown).

The second partition member 16 has the same structure as the first partition member 15, and comprises the same cylindrical body as that of the first partition member 15, a partition plate 14 dividing the inside space of the cylindrical body and holes formed by drilling the first gas exhaust section 4 and the second gas introduction section 5 which are partitioned by the partition plate 14. The hole formed in the second gas introduction section 5 is communicated with a process air introduction port (not shown) through, for example, a fan (not shown). As examples of the process air introduced from the process air introduction port, the atmospheric air, a contaminated process air containing organic substances from a clean room, and the like. The hole formed by drilling in the second gas exhaust section 6 is communicated with, for example, a clean room (not shown).

In the air filter according to the present invention, the first partition member 15, the honeycomb rotor 1, and the second partition member 16 are arranged in this order as mentioned above, so that a gas 31 can be supplied to the regenerative/purge zone 21 to be formed at the portion facing the first gas introduction section 3 in the filter surface of the honeycomb rotor 1, a gas 32 which has passed through the regenerative/purge zone 21 can be exhausted from the first gas exhaust section 4, a gas 41 can be supplied to a treating zone 22 to be formed at the portion facing the second gas introduction section 5 in the filter surface of the honeycomb rotor 1, and a gas 42 which has passed through the treating zone 22 can be exhausted from the second gas exhaust section 6. The manner of dividing the first partition member 15 by the partition plate 13 or the second partition member 16 by the partition plate 14 is appropriately designed taking into account, for instance, the ratio of the area of the regenerative/purge zone 21 to the area of the treating zone 22, and the like.

The heater 7 is disposed connecting to the first gas introduction section 3, so that gas introduced from the outside is allowed to pass through the heater 7 and supplied to the first gas introduction section 3. If a heater controller (not shown) which turns on the heater 7 during a regenerative period, namely, the first half of a regenerative/purge period from the time when the honeycomb rotor 1 stops rotating until it starts rotating and turns off the heater 7 during the latter half purge period is connected to the heater 7, switching from the regenerating step to the purging step is automatically accomplished.

Here, the regenerative/purge period means a period obtained by adding the period of time required for the regenerating step and the period of time required for the purging step. The regenerating step is a step of desorbing organic substances, acidic gases, basic gases, and the like contained in the process air from the porous adsorbent of the honeycomb rotor 1 using heated clean gas. The purging step is a step of adsorbing moisture contained in clean air which is at ordinary temperature to the porous adsorbent until moisture is adsorbed to the porous adsorbent to saturation under the same conditions as in the regeneration step, except that the heater 7 is switched off after the regenerating step is finished.

Examples of the heater controller include a type which switches on and off in accordance with the preset times and a type which switches on and off the heater 7 according to the moisture measured using a hygrometer installed in the first exhaust section 4 or the like.

Also, it is preferable to install a blower or a fan (not shown) on the inlet side of the first gas introduction section 3, the outlet side of the first gas exhaust section 4, the inlet side of the second gas introduction section 5, and the outlet side of the second gas exhaust section 6, as a means for introducing gas into the first gas introduction section 3 and the second gas introduction section 5. It is preferable to install a blower on the outlet side of the first exhaust section 4 and a fan on the inlet side of the second gas introduction section 5, because this arrangement allows no contaminated gas to flow into the clean room.

The action of the aforementioned air filter will now be described. First, the case where the regenerative/purge zone 21 is in the regenerating step while the operation of the honeycomb rotor 1 is suspended will be explained. In the first place, the process air 41 such as the contaminated air from the atmosphere or the clean room is introduced into the treating zone 22 of the honeycomb rotor 1 from the second gas introduction 5, and the treated gas 42 after the adsorbing process in the honeycomb rotor 1 is exhausted from the second gas exhaust section 6. During this operation, the regenerated gas 31 obtained by heating clean air in the clean room with heater and the like is introduced into the regenerative/purge zone 21 of the honeycomb rotor 1 from the first gas introduction section 3, and the desorbed gas 32 obtained after the desorbing treatment in the honeycomb rotor 1 is discharged from the first exhaust section 4.

These operations ensure that organic substances, acidic gases, basic gases and the like contained in the air to be treated are adsorbed and removed in the treating zone 22, and at the same time, organic substances, acidic gases, basic gases and the like adsorbed by the porous adsorbent during the treating step in the regenerative/purge zone are desorbed and removed.

Second, the case where the regenerative/purge zone 21 is in the purge step while the operation of the honeycomb rotor 1 is suspended will be explained. In the treating zone 22, the same process step as in the case where the regenerative/purge zone 21 is in the regenerating step is carried out. In the regenerative/purge zone 21, on the other hand, clean air which is at ordinary temperature unheated (because the heater is switched off) is introduced as the purge gas 31. The introduction of the purge gas is continued until moisture is adsorbed to the porous adsorbent of the honeycomb rotor 1 to saturation. By this operation, organic substances, acidic gases, basic gases and the like contained in the process air is adsorbed and removed in the treating zone 22 and at the same time, moisture is adsorbed by the porous adsorbent to saturation in the regenerative/purge zone. Therefore, when the porous adsorbent is moved to the treating zone 22 afterwards by the rotation of the honeycomb rotor 1, unnecessary removal of moisture from the process air can be avoided and only chemicals are adsorbed.

In this manner, in the air filter of the present invention, the honeycomb rotor is suspended in the regenerative zone of the honeycomb rotor, the heater is turned on for the period of time required for the regeneration of the porous adsorbent while causing the air to flow in the regenerative zone, and then the heater is turned off when the regeneration is finished to flow only air whereby purging can be carried out. The porous adsorbent adsorbs water sufficiently to saturation by the purging. When the honeycomb rotor is rotated to move the porous adsorbent to the treating zone under this condition, moisture is not adsorbed but only chemical substances are adsorbed. As a consequence, the moisture of the air which has passed through the treating zone is maintained constant. In addition, if a purge operation is carried out for a sufficient period of time to make the humidity after purging same as the humidity of the atmosphere in the room, the humidity of the air after passing through the successive adsorbing zone becomes the same as the humidity of the atmosphere in a room. This renders an operation of humidifying the air unnecessary, saving expenses relating to a temperature/humidity sensor, pure water, and humidifier. In addition, it possible to make the entire air filter equipment to become compact.

EXAMPLES

The present invention will be described in more detail by examples, which should not be construed as limiting the present invention.

Example 1

90 parts by weight of Fine Flex (manufactured by Nichias Corporation, composition, $Al_2O_3$: 50 wt %, $SiO_2$: 50 wt %), 10 parts by weight of pulp, and 2 parts by weight of polyvinyl alcohol as a binder were dispersed in 10,000 parts by weight of water to make a slurry, which was then made into paper using a cylinder paper machine according to a conventional method to obtain ceramic papers having a fiber void ratio of 90% and a thickness of 0.2 mm. The resulting ceramic papers were divided into those to be corrugated and those not to be corrugated. The paper to be corrugated was caused to pass through a pair of upper and lower corrugated rolls to produce a corrugated material. Glue prepared by blending 90 parts by weight of colloidal silica with 10 parts by weight of Aerogyl was applied to the convex portion of the corrugated material. The non-corrugated flat paper was placed on the convex portion of the corrugated paper and the both were pressed to bind them, thereby producing an integrated material. The resulting single-side corrugated board (the integrated material) was wound around a shaft with a diameter of 35 mm until the outside diameter reached 630 mm while applying glue to the convex portion of the single-side corrugated board. Then, the resulting product was cut so that a product with a length of 400 mm in the airflow direction can be obtained. A honeycomb rotor having an outside diameter of 630 mm, thickness of 400 mm, corrugate pitch of 2.8 mm, and cell height of 1.3 mm was obtained in this manner.

This honeycomb rotor was impregnated with a slurry prepared by thoroughly blending 20 parts by weight of faujasite type zeolite, 50 parts by weight of colloidal silica, and 36 parts by weight of water, followed by blowing, then dried at 180° C. for 30 minutes and baked at 500° C. for 60 minutes to obtain a filter carrying an adsorbent.

A hole 35 mm in diameter was formed at the center of the filter carrying an adsorbent and a rotation shaft 25 mm in diameter was installed in the hole through a bearing. A timing belt was provided between the outer periphery of the filter and a motor so that the filter can be rotated.

Two gas introduction members, each having a shape of cylinder with a diameter almost equal to the outside diameter of the honeycomb rotor, the inside thereof being divided into two compartments by a partition plate, were disposed in almost close contact with two filter surfaces on the front and back sides of the honeycomb rotor respectively so that the partition plates for the gas introduction members on the gas introduction member side and on the gas exhaust member side come to the same position. Each partition in the gas introduction members were produced so that two sectors with a ratio of the sectional area of 7:1 were produced, when each gas introduction member was cut along a plane perpendicular to the gas introducing direction. The sectorial portion occupying ⅞ of the filter surface of the honeycomb rotor was defined as the treating zone and the sectorial portion occupying the remainder, namely, ⅛ of the filter surface of the honeycomb rotor was defined as the regenerative/purge zone.

The directions of gas introduced to the treating zone and the regenerative/purge zone were designed such that gas is introduced into the treating zone from one of two filter surfaces of the adsorbent-carrying filter and into the regenerative/purge zone from another filter surface, whereby the gas in the treating zone flows counter-currently to the gas flow of in the regenerative/purge zone so that the two gases may not mix in the honeycomb rotor. In addition, partitions were provided between the gas introduction section of the treating zone and the gas exhaust section of the regenerative/purge zone and between the gas exhaust section of the treating zone and the gas introduction section of the regenerative/purge zone to prevent the mingling of the gas introduced into the treating zone with the gas to be exhausted from the regenerative/purge zone and the mingling of the gas to be exhausted from the treating zone with the gas introduced into the regenerative/purge zone. An air fan was installed on the gas introduction side of the treating zone so as to feed the air to be treated into the treating zone and a suction blower was installed on the gas exhaust side of the regenerative/purge zone so as to suck the gas exhausted from the regenerative/purge zone.

A timer was connected to the motor to ensure intermittent rotation. The air filter was thus completed. The ON-OFF operation of the heater when switching from the regenerating step to the purging step was manually carried out. The rotation of the honeycomb rotor when switching from the treating zone to the regenerative/purge zone and from the regenerative/purge zone to the treating zone was accomplished in about several seconds.

Performance of the above air filter to remove ammonia and N-methyl-2-pyrrolidone (hereinafter referred to from time to time as "NMP") in air was measured. The treating conditions and the results are shown in Tables 1 to 4.

TABLE 1

| Treating condition | Example 1 | Example 2 | Example 3 | Comparative Example 1 |
|---|---|---|---|---|
| Air rate on the treating surface (m/s) | 1.5 | 3.0 | 3.0 | 3.0 |
| Treating time (hr) | 15 | 15 | 30 | 22.5 |
| Regenerating time (min) | 15 | 15 | 15 | 3.75 |
| Purge time (min) | 15 | 15 | 15 | 3.75 |
| Rotations (rpm) | — | — | — | 2 |
| Area of the treating zone: area of the regenerative/purge zone | 7:1 | 7:1 | 7:1 | 6:2*1 |
| Operation rate of the heater*2 | 11.7 | 11.7 | 23.4 | 100 |

*1 Area of the treating zone:area of the regenerative zone:area of the purge zone = 6:1:1
*2 Operation rate (per hour) of the heater required when the honeycomb rotor was made one revolution.

TABLE 2

| Temperature of gas in the vicinity of the honeycomb rotor | Example 1 | Example 2 | Example 3 | Comparative Example 1 |
|---|---|---|---|---|
| Gas passing through the treating zone | | | | |
| Introduction gas during the regenerating step | 26 | 30 | 24 | — |
| Exhaust gas during the regenerating step | 28 | 32 | 26 | — |
| Introduction gas during the purging step | 26 | 29 | 29 | — |
| Exhaust gas during the purging step | 27 | 30 | 30 | — |
| Introduction gas | — | — | — | 23 |
| Exhaust gas | — | — | — | 28 |
| Gas passing through the regenerative/ purge zone | | | | |
| Introduction gas during the regenerating step | 150 | 150 | 200 | — |
| Exhaust gas during the regenerating step | 61 | 67 | 91 | — |
| Introduction gas during the purging step | 26 | 26 | 31 | — |
| Exhaust gas during the purging step | 29 | 29 | 31 | — |
| Gas passing through the regenerative zone | | | | |
| Introduction gas | — | — | — | 200 |
| Exhaust gas | — | — | — | 75 |
| Gas passing through the purge zone | | | | |
| Introduction gas | — | — | — | 25 |
| Exhaust gas | — | — | — | 40 |

※ the unit in the table is ° C.

TABLE 3

| Absolute humidity of gas | Example 1 | Example 2 | Example 3 | Comp. Example 1 |
|---|---|---|---|---|
| Gas passing through the treating zone | | | | |
| Introduction gas | 9.36 | 6.81 | 9.33 | 6.91 |
| Exhaust gas | 9.35 | 6.86 | 9.55 | 6.55 |

※ the unit in the table is "g/kg'".

TABLE 4

| | Example 1 | Example 2 | Example 3 | Comp. Example 1 |
|---|---|---|---|---|
| Capability to remove NH$_3$ | | | | |
| Inlet concentration (ppb) | 325 | 600 | 250 | 300 |
| Outlet concentration (ppb) | 1.5 | 1.0 | 1.0 | 1.2 |
| Removal rate (%) | 99.5 | 99.9 | 99.6 | 99.6 |
| Capability to remove NMP | | | | |
| Inlet concentration (ppb) | 1500 | 2500 | 1250 | 1000 |
| Outlet concentration (ppb) | 6.0 | 7.0 | 10.0 | 2.0 |
| Removal rate (%) | 99.6 | 99.8 | 99.2 | 99.8 |

Examples 2, 3

Performance to remove ammonia and NMP in air was measured in the same manner as in Example 1 except that the treating conditions and the like were altered as shown in Tables 1 to 4. The treating conditions and the results are shown in Tables 1 to 4.

Comparative Example 1

Two gas introduction members, each having a shape of cylinder with a diameter almost equal to the outside diameter of the honeycomb rotor, the inside thereof being divided into three compartments by partition plates, were disposed in almost close contact with two filter surfaces on the front and back sides of the honeycomb rotor respectively so that the partition plates for the gas introduction members on the gas introduction member side and on the gas exhaust member side come to the same position. Each partition in the gas introduction members were produced so that three sectors with a ratio of the sectional area of 6:1:1 were produced, when each gas introduction member was cut along a plane perpendicular to the gas introducing direction. The sectorial portion occupying 6/8 of the filter surface of the honeycomb rotor was used as the treating zone and the sectorial portions occupying the remaining 1/8 of the filter surface of the honeycomb rotor were used as a regenerative zone and purge zone.

Performance to remove ammonia and NMP in air was measured in the same manner as in Example 1 except that the treating conditions in the treating zone were altered as shown in Tables 1 to 4 and the honeycomb rotor was rotated continuously at a rate of two revolutions per hour. The treating conditions and the results are shown in Tables 1 to 4.

In the air filter of the present invention, the honeycomb rotor is intermittently rotated and the treating step, the regenerating step, and the purging step are carried out in a period during which the honeycomb rotor is suspended. Therefore, it is unnecessary to rotate the honeycomb rotor continuously as in the case of conventional air filters and it is therefore possible to remarkably decrease the power consumption of the driving motor of the honeycomb rotor. In addition, since the regenerating step is switched from the purging step by the ON-OFF operation of the heater while suspending the rotor in the same zone, it is unnecessary to operate the heater continuously as in the case of conventional air filters, whereby power consumption can be significantly decreased.

INDUSTRIAL APPLICABILITY

The air filter of the present invention can be used as air filters to clean air for devices and air inside of a clean room in the production of semiconductors, liquid crystals, optoelectronics, and the like.

What is claimed is:

1. An air filter comprising:
   - a honeycomb rotor which carries a porous adsorbent and is configured to be rotated in a circumferential direction;
   - a drive means configured to rotate the honeycomb rotor;
   - a first gas introduction section disposed on one side of the honeycomb rotor;
   - a second gas introduction section disposed on another side of the honeycomb rotor, the first and second gas introduction sections configured to introduce countercurrently flowing two types of gases into different conduits;
   - a first gas exhaust section which is disposed on the other side of the honeycomb rotor and configured to introduce the gas which is introduced from the first gas introduction section and to be exhausted through the honeycomb rotor;
   - a second gas exhaust section which is disposed on the one side of the honeycomb rotor and configured to introduce the gas which is introduced from the second gas introduction section and to be exhausted through the honeycomb rotor;
   - a heater disposed at an inlet port of the first gas introduction section;
   - a drive controller for controlling a drive means so that the honeycomb rotor can rotate intermittently by every part of a regenerative-purge zone opposing to the first gas introduction section in the filter surface of the honeycomb rotor; and
   - a heater controller configured to put said heater in an ON-state during a regenerative period of the first half of a regenerative/purge period starting from the time when said honeycomb rotor stops rotating until it starts rotating and puts said heater in an OFF-state during the latter half purge period.

2. The air filter according to claim 1, wherein said purge period is longer than a time required for moisture to be adsorbed in an amount to make said porous adsorbent saturated.

3. The air filter according to claim 1, wherein said honeycomb rotor further comprises a gas reactive material.

4. The air filter according to claim 1, wherein said first gas introduction section is configured to receive clean air from a clean room and the second gas introduction section is configured to receive air to be treated containing organic substances.

5. The air filter according to claim 1, wherein said second gas exhaust section is configured to communicate with an inside of a clean room.

* * * * *